US006647262B1

(12) United States Patent
Demetrescu et al.

(10) Patent No.: US 6,647,262 B1
(45) Date of Patent: Nov. 11, 2003

(54) CELLULAR RADIO COMMUNICATION HANDOVER SYSTEMS

(75) Inventors: Cristian Demetrescu, Twickenham (GB); Constantin Ilas, Swindon (GB); Konstantinos Samaras, Swindon (GB); Louis Gwyn Samuel, Swindon (GB); Fiona Clare Angharad Somerville, Millbrook Place (GB); Jian Jun Wu, Reading (GB); Ran-Hong Yan, Farington (GB)

(73) Assignee: Lucent Technologies Inc., Murray Hill, NJ (US)

( * ) Notice: Subject to any disclaimer, the term of this patent is extended or adjusted under 35 U.S.C. 154(b) by 466 days.

(21) Appl. No.: 09/651,540

(22) Filed: Aug. 29, 2000

(30) Foreign Application Priority Data

Aug. 31, 1999 (EP) .............................. 99306933

(51) Int. Cl.[7] ................................. H04Q 7/20
(52) U.S. Cl. ..................... 455/436; 455/437; 370/331
(58) Field of Search ................. 455/436, 437, 455/466, 422, 433; 370/331, 332, 338, 349, 353, 29, 24; 379/60, 56, 58, 59; 341/60

(56) References Cited

U.S. PATENT DOCUMENTS 4,916,691 A * 4/1990 Goodman .................... 370/389

| 5,371,780 | A | * | 12/1994 | Amitay | 455/450 |
|---|---|---|---|---|---|
| 5,384,826 | A | * | 1/1995 | Amitay | 455/436 |
| 5,420,851 | A | * | 5/1995 | Seshadri et al. | 370/280 |
| 5,930,241 | A | | 7/1999 | Fried | 370/328 |
| 5,930,721 | A | | 7/1999 | Fried et al. | 455/466 |
| 6,266,527 | B1 | * | 7/2001 | Mintz | 455/423 |
| 6,300,877 | B1 | * | 10/2001 | Schannach et al. | 340/635 |

FOREIGN PATENT DOCUMENTS

| GB | 2332340 A | 6/1999 | ............ H04Q/7/38 |
|---|---|---|---|
| WO | WO 98/09454 | 3/1998 | ............ H04Q/7/22 |

OTHER PUBLICATIONS

European Search Report, dated Feb. 10, 2000.

* cited by examiner

Primary Examiner—Nguyen T. Vo
Assistant Examiner—Kamran Afshar

(57) ABSTRACT

The system includes a network having a base controller (30) and a mobile station (32). The base controller (30) has a packet measurement order unit (34) which causes a package measurement reporter (68) in the mobile station to provide a measurement report. This report is stored in a buffer (44) and compared with reference values on a reference unit (48). If a change of cell is warranted, a packet cell change order unit (50) issues a command which is recorded by packet cell change unit (58) of the mobile station to retune the transmitter and receiver (54 and 56) to a new cell. The mobile station also has a unit (64) which generates a package cell change request to the base controller (30) to initiate a package cell change order from the unit (50) when a change is warranted.

8 Claims, 6 Drawing Sheets

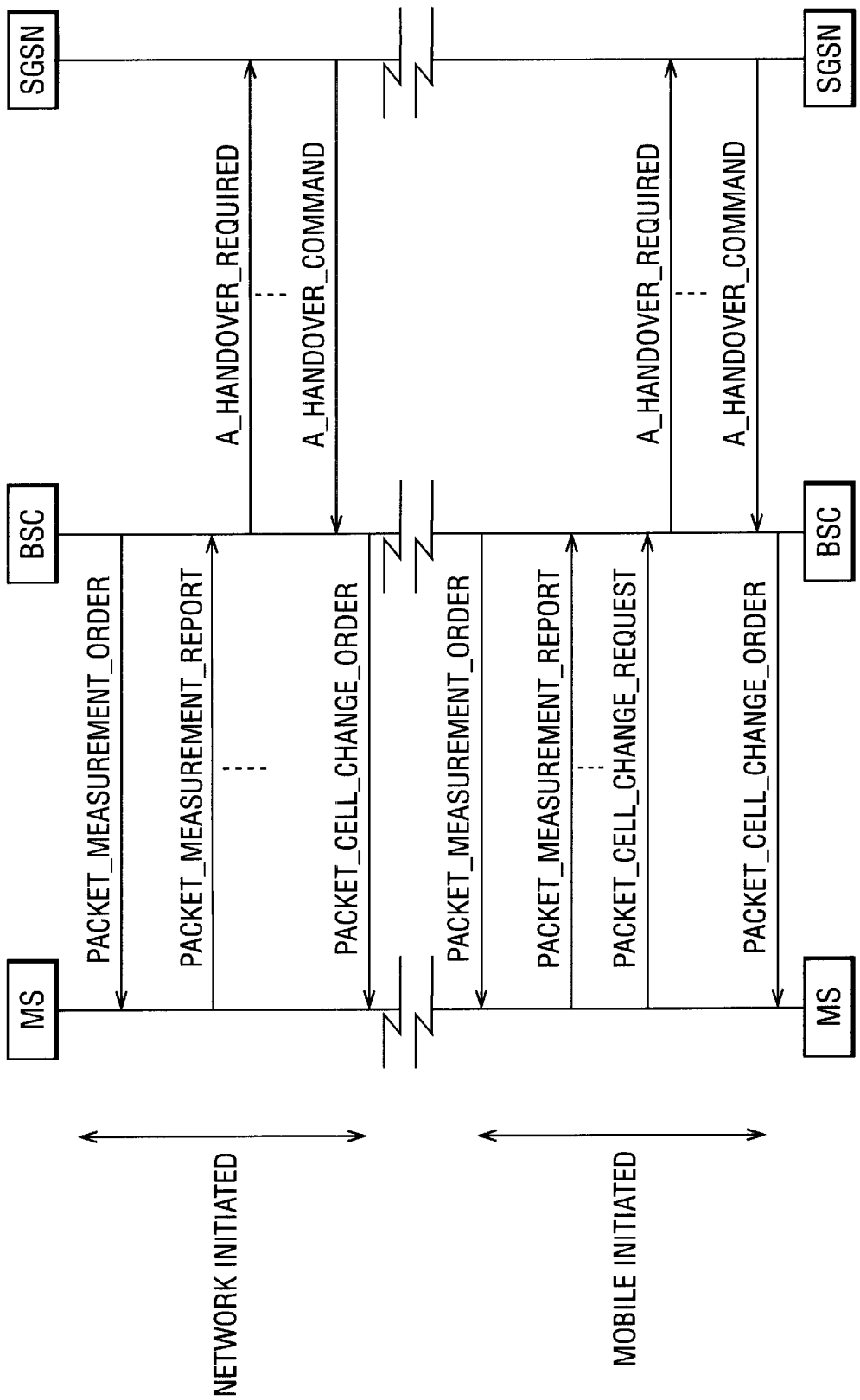
FIG. 3 Setup of RT GPRS Handover - Signalling Flows

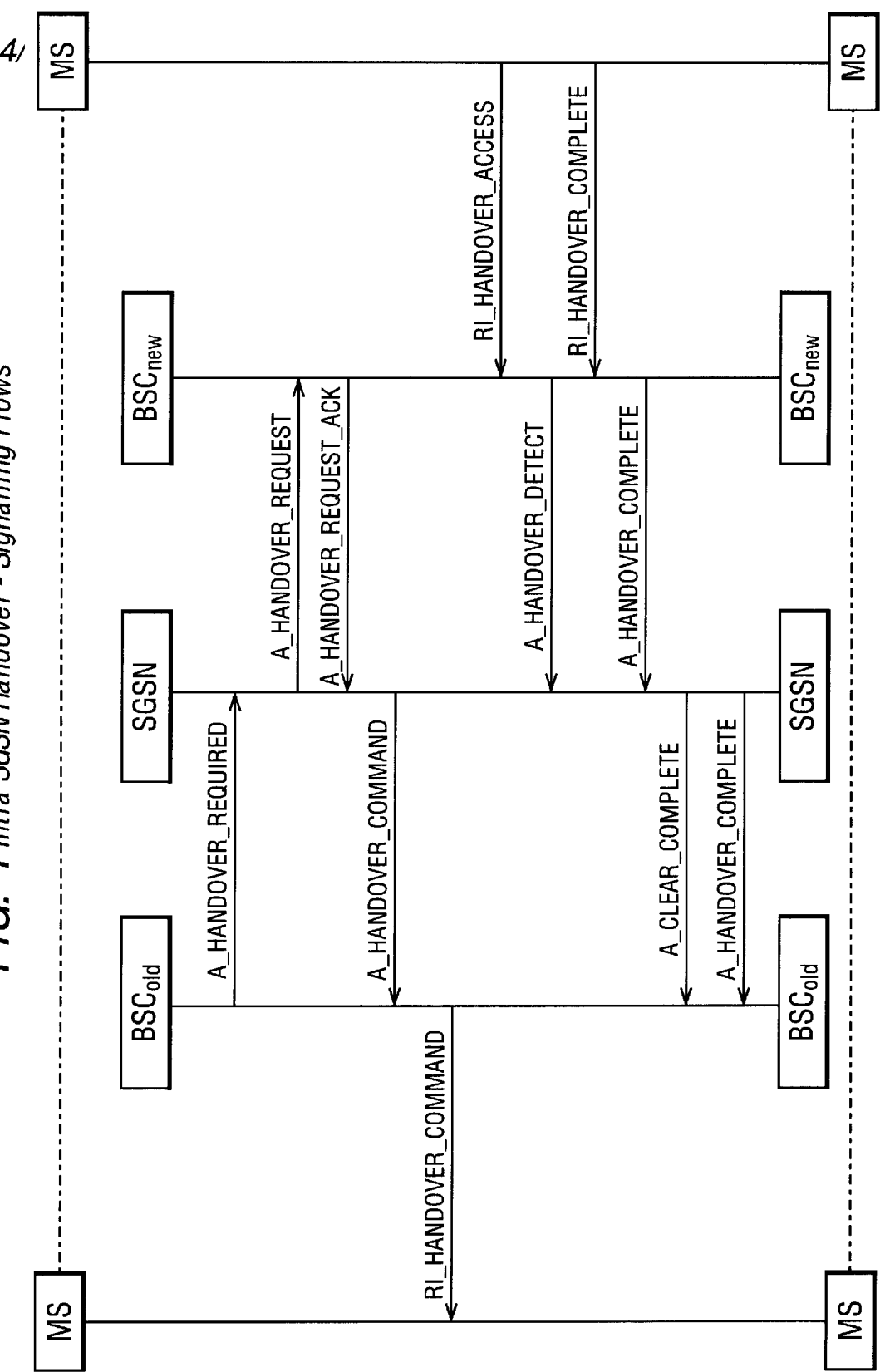
FIG. 4 Intra SGSN Handover - Signalling Flows

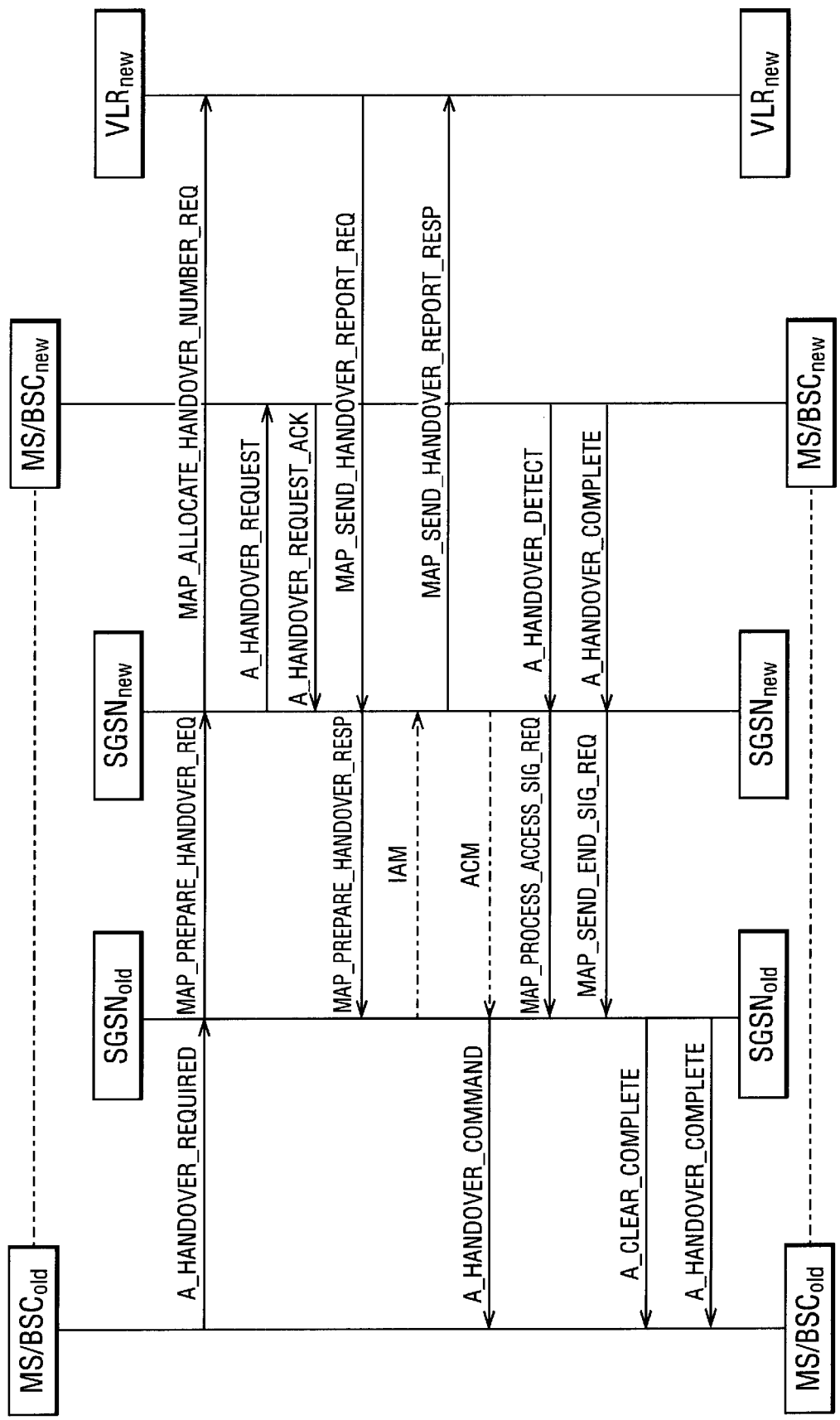
FIG. 5 Inter SGSN Handover - Signalling Flows

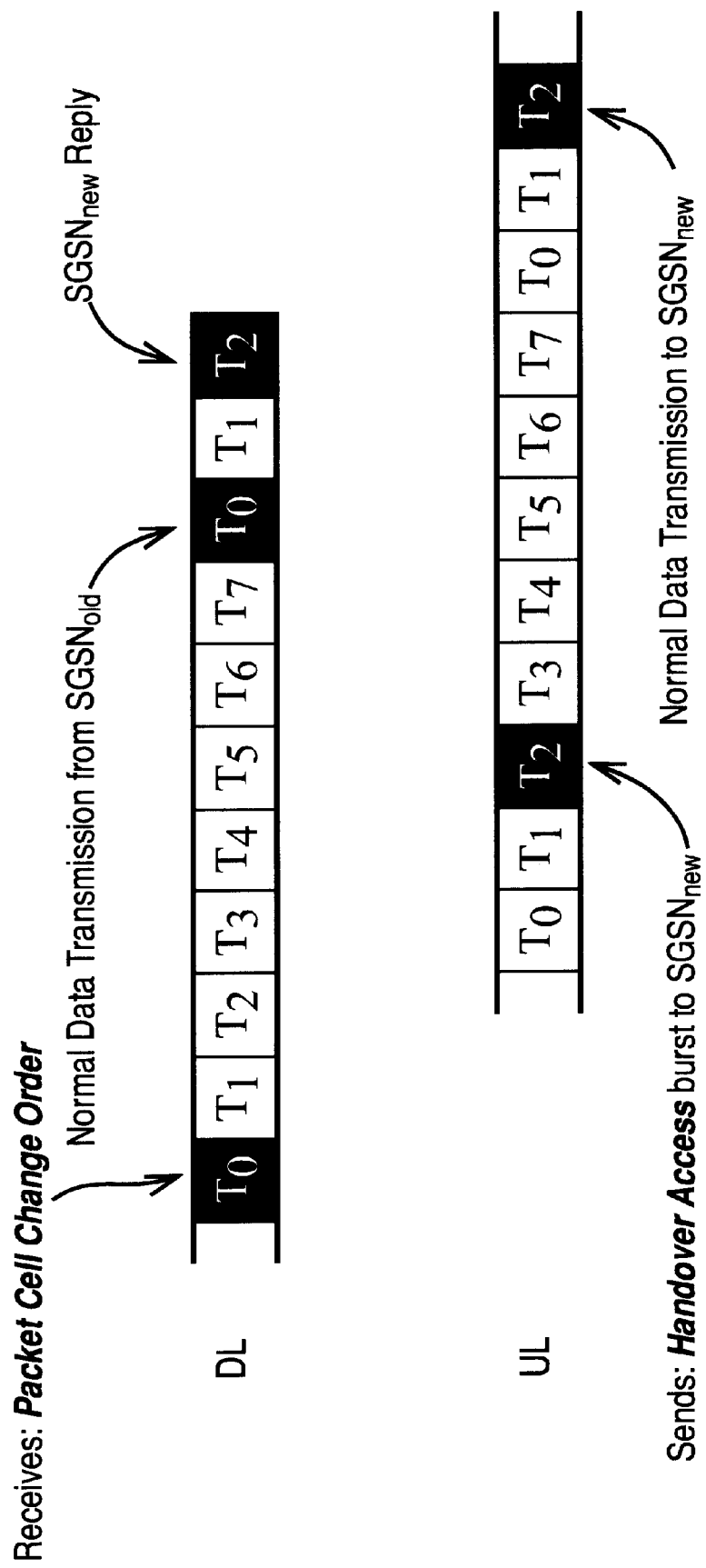
FIG. 6 MS Passive Phase Handover Access

CELLULAR RADIO COMMUNICATION HANDOVER SYSTEMS

CROSS-REFERENCE TO RELATED APPLICATION

This application claims priority of European Patent Application No. 99306933.5, which was filed on Aug. 31, 1999.

FIELD OF INVENTION

The present invention relates to cellular radio communication handover systems.

In packet switched cellular radio communication systems, a mobile station sends and receives data to and from a selected cell in discrete packets during a selected time slot of a time division multiplex cycle. Other mobile stations use other slots in the multiplexed cycle. When the mobile station moves to another cell, it effects a handover for transmitting packets of data from the old cell to the new cell.

Using ETSI (European Transmission Standards Institute) standards for General Packet Radio Service (GPRS) or Enhanced General Packet Radio Service (EGPRS) Real Time (RT) service during handover cannot be maintained as EGPRS was primarily designed for Non-Real Time (NRT) data flows. Thus, during the cell handover period, data flow is stopped completely before handover takes place and is only recommenced after handover has been completed. The reliability of Quality of Service (QoS) under these conditions is thus guaranteed over the air (Um) interface using acknowledgements of correct packet transfers with corrupted packets being retransmitted.

The decision to transfer control of data flow from one cell to another in this arrangement is taken by the mobile station rather than the network.

In these circumstances, the packet flow during real time transmissions is interrupted and data is lost because of the long delay over which handover takes place. This will cause some annoyance to the end user of the flow.

BACKGROUND OF THE INVENTION

Under EGPRS when a mobile station decides that the quality of transmission in a particular cell is becoming poor, it switches to another cell having a better transmission quality. To accomplish this, it puts into effect the following procedures.

1) It aborts any or all "temporary" block flows (TBF) in progress by immediately ceasing decoding on the downlink (DL) and ceasing to transmit on the uplink (UL).

2) It stops all the mobile timers related to measurement reporting.

3) The mobile station switches to the selected cell obeying all the relevant RLC/RAC (Radio Link Control/Random Access Control) procedures for the new cell; ie it reattaches itself to the new cell by performing a packet channel request on the PACH/PRACH (Packet Access Channel/Packet Random Access Channel) channel.

The net effect of these procedures is that data flow is completely interrupted. Also the mobile station may have to compete for resources in the new cell in order to re-establish data flows thereby increasing the delay still further before data flow can be resumed. It will thus be apparent that the current standards for GPRS and EGPRS do not provide satisfactory QoS for RT transmissions during handover.

SUMMARY OF THE INVENTION

According to the present invention there is provided a packet switched cellular radio communication handover system for effecting handover of radio transmissions between a mobile station and one cell of a multicell network to radio transmissions between the said mobile station and other cells of the network, the network having reporting means for causing the mobile station to take and report back measurements on a given list of cells, selection means for selecting a said cell by comparing the measurements with a predetermined criteria, and handover means for forcing the mobile station to handover to the selected cell.

According to the present invention there is further provided a cellular radio communication system for effecting handover of radio transmissions between a mobile station and one cell of a multicell network from said one cell to another cell of the network, the mobile station having a plurality of modes of operation in conjunction with the network including a) mobile station controlled autonomous reselection with no measurements being reported to the network, b) mobile station controlled autonomous cell reselection with a measurement report being transmitted to the network, c) network controlled cell reselection with a measurement report from the mobile station to the network, and d) network controlled real time cell selection with a measurement report from the mobile station to the network.

According to the present invention there is still further provided a cellular communication handover system for effecting handover of radio transmission between a mobile station and one cell of a multicell network to radio transmission between said mobile station and other cells of the network, the network having handover means for forcing the mobile station to handover to a selected cell, the mobile station including mean talk spurt means for establishing the mean talk spurt in the transmissions to and from the mobile station, activity monitoring means for monitoring a predetermined type of activity of the transmitter and receiver of the mobile station, and delay means operable to delay any handover operation while said activity monitoring means senses activity for a period corresponding to the period of the mean talk spurt.

BRIEF DESCRIPTION OF THE DRAWINGS

FIG. 3 is a flow chart illustrating the initiation of real time GPRS or EGPRS handovers;

FIG. 4 is a flow chart illustrating INTRA handovers;

FIG. 5 is flow chart illustrating INTER, SGSN handovers; and

FIG. 6 is a timing diagram illustrating passive phase handover access.

DETAILED DESCRIPTION OF THE PREFERRED EMBODIMENT OF THE INVENTION

Figure 1:
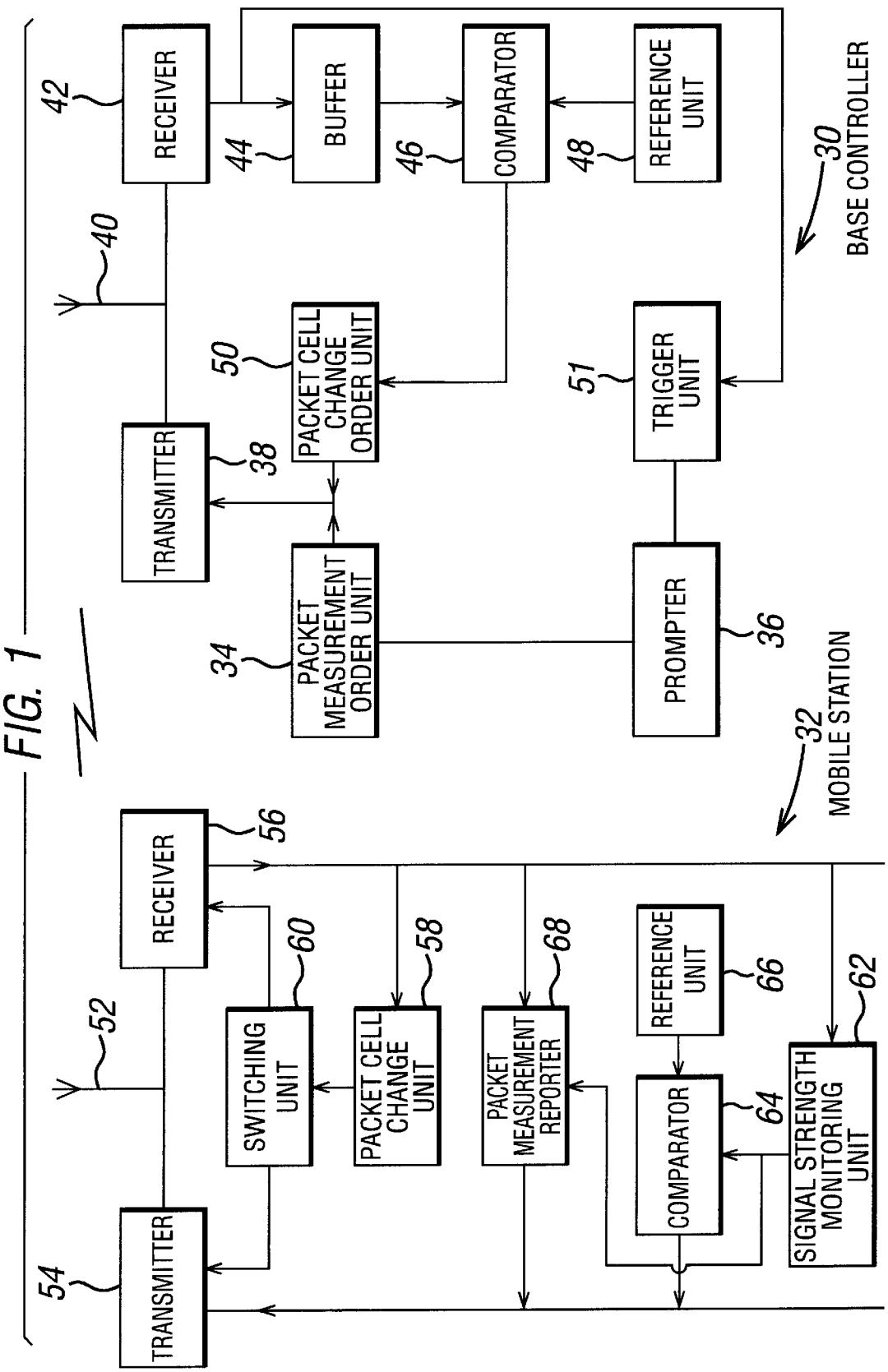
FIG. 1 is a block diagram of part of a mobile station and part of a base controller.

Current (E)GPRS standards do have a certain amount of built-in flexibility. This flexibility allows the network to indicate which measurements it requires the mobile station (MS) to make (Packet Measurement Order), for the mobile station to report these measurements to the network (Packet Measurement Report) and to force the mobile station to reselect a given cell (Packet Cell Change Order). Handover management is achieved mostly under the control of the Base Station Controller (BSC) to decrease handover delay.

RT handovers in GPRS/EGPRS is achieved by adopting GSM (Global System for Mobile Communications) call set up procedures for GPRS/EGPRS at the Servicing GPRS Support Node (SGSN). This means that the procedures for RT GPRS/EGPRS handover will be the same as the call set up procedures for GSM, ie the signalling required for inter and intra Mobile Switching Centre (MSC) handovers are adopted for GPRS at the SGSN (servicing GPRS-mode). The reason for this is, that it is the setting up of the handover channel that is the guarantee for the QoS at handover, ie a channel must be prepared in anticipation of the mobile stations movement into the new cell. The subtle difference between GSM and GPRS/EGPRS is that in inter MSC handovers, a channel is set up between the $MSC_{old}$ and the $MSC_{new}$, whereas in GPRS/EGPRS a new data flow must be set up between the $SGSN_{old}$ and $SGSN_{new}$. The actual mechanics of the handover is new since this is an amalgam of the current GPRS/EGPRS cell reselection and GSM handover mechanisms.

To perform handovers in RT GPRS/EGPRS, a pseudo GSM handover methodology is adopted. In order for pseudo GSM handovers to take place, the mobile station must report measurements back to the network. Additionally, the network must force the mobile to handover to a prescribed cell, in effect force a cell-reselection. This requires the mobile to operate in network controlled (NC) 2 mode. Currently, the NC field is a two bit field. This field sets the reporting and handover characteristics of the mobile.

In the present case, the NC field is increased to three bits to define a new mode NC3 which would be RT GPRS/EGPRS handover mode, ie in this mode the mobile station can also signal a request for handover to the network. Sending the mobile station either a Packet Measurement Order or a Packet Cell Change Order subsequent to an initial Packet Measurement Order sets the NC mode. The definition of the new NC field is described hereinafter.

In $NC_2$ ($NC_3$) the mobile station is instructed to take and report measurements on a given list of cells. The natural choice of measurements to take would be those currently taken by a GSM mobile station in order to perform handover measurements. To do this, we define a new measurement reporting list in the Packet Measurement Report message, ie: NC handover Measurement Report struct.

The mobile reports back measurements to the network. The network then decides that a handover should take place for the given mobile based on network specific handover criteria. Or alternatively the mobile decides on local criteria that a handover is required. This alternative is in keeping with GPRS/EGPRS mobile station autonomy in cell reselection. When the mobile decides that a handover is required, it signals this by sending a Packet Cell Change Request message. The signal flows for the initiation of RT GPRS/EGPRS handovers is given in FIG. 3. The subsequent signalling for the handover remains the same as that for GSM. Examples of INTRA and INTER SGSN handovers are given in FIG. 4 and FIG. 5 respectively.

The structure of the base controller 30 and the structure of the mobile station 32, for achieving this, is shown in FIG. 1.

As can be seen, the base controller 30 has a packet measurement order unit 34 which responds to a periodic prompt from a prompter 36 to send out a package measurement order via a transmitter 38 and an antenna 40 to the mobile station 32. The resulting package measurement report is received from the mobile station 32 via the antenna 40 and a receiver 42. The report is stored in a buffer 44 and compared by a comparator 46 with threshold values stored in a reference unit 48. When a change of cell is warranted, the comparator 46 triggers a packet cell change order unit 50, which transmits the requisite order via the transmitter 38 to the mobile station. The output of the receiver 42 is connected to a trigger unit 51 which, upon detecting a request to change cells from the mobile station, causes the prompter 36 to trigger the packet measurement order unit into operation.

The mobile station 32 has an antenna 52, a transmitter 54 and a receiver 56. A packet cell change unit 58 is connected to the output of the receiver 56 and responds to an appropriate packet cell change order to cause a switching unit 60 to switch the transmitter 54 and receiver 56 to a new cell.

A packet measurement reporter 68 is connected to the output of the receiver 56 and sends a package measurement report, derived from a signal strength monitoring unit 62, to the base controller 30 via the transmitter 54 and antenna 52. The signal strength monitoring unit 62 is connected to the output of the receiver 56 to monitor the signal strength. A comparator 64 compares the monitored level with a reference level stored in a reference unit 66 and generates a package cell change request which it transmits via the transmitter 54 and antenna 52 to the base controller.

For the actions taken by the mobile station when handing over during a RT GPRS/EGPRS call, we use the example of Voice over GPRS (VoGPRS). We assume that the mobile is operating in VoGPRS polling mode, ie if the mobile is active it has a dedicated Packet Data Traffic Channel (PDTCH); otherwise, it is in its passive phase waiting to be polled with the possibility of having RT data ready to transmit.

On the receipt of the Packet Cell Change Order message, the mobile does not instantly hand over providing that the signal strength still allows radio communication between MS and network. The commencement of the handover depends on which phase the mobile is in when it receives the Packet Cell Change Order. If the mobile is in an active phase, it starts a handover timer, $T_{HO}$. $T_{HO}$ has a period equal to the mean talk spurt. If the mobile has not entered a passive phase by the time $T_{HO}$ expires, then the mobile hands over to the given cell. However, if the mobile is in a passive phase or enters the passive phase before the timer $T_{HO}$ expires then the handover commences immediately. In this manner, we simplify the handover in terms of the Temporary Block Flows (TBFs) since we have one less (uplink) flow to manage during the handover, ie we are using the statistical nature of the voice traffic to assist and improve the RT handover characteristics for this type of service. This is a benefit to the mobile because the mobile need not burden itself with additional processing required for the management of uplink and handover transmissions, ie the mobile needs only to schedule handover transmissions.

In the passive phase, the mobile re-tunes to the new cell time slot and frequency (information contained in the Packet Cell Change Order message). The mobile then sends Handover Access burst messages containing the handover reference number given to it in the Packet Cell Change Order message. The handover reference number is a unique number generated by the $SGSN_{new}$. The $SGSN_{new}$ recognises that the mobile is handing over because four Handover Access burst messages are sent in quick succession (on successive bursts –20 ms worth) on the given channel. The $SGSN_{new}$ replies back on the equivalent downlink channel timeslot. The mobile is then ready to transmit on the same timeslot on the uplink to the $SGSN_{new}$ or be polled in the next downlink timeslot. This behaviour is depicted in FIG. 6. Note: The signalling of the Packet Cell Change Order occurs in a stolen downlink frame from the voice service.

Figure 2:
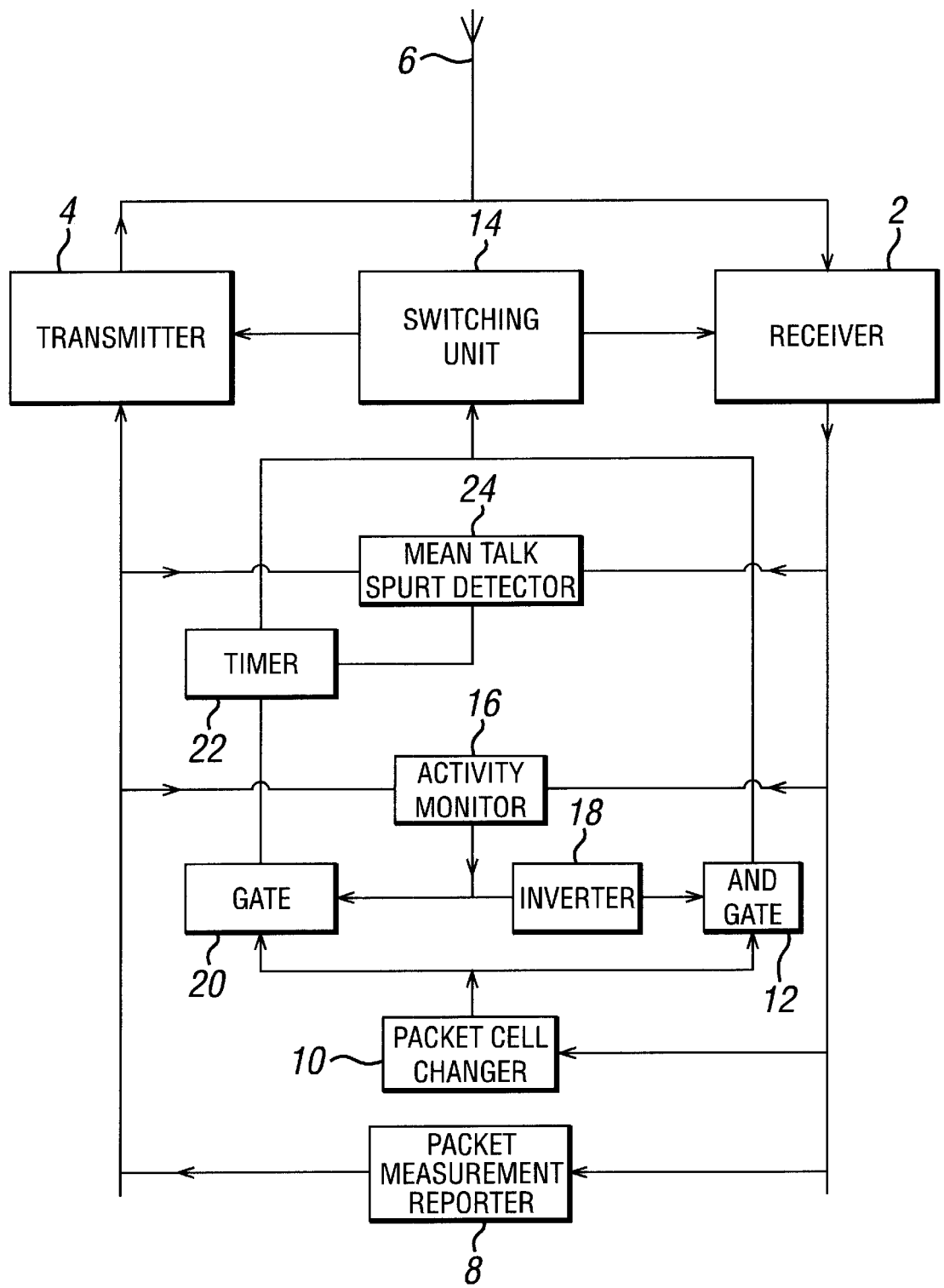
FIG. 2 is a block diagram of part of a mobile station.

The structure of the mobile station to effect this procedure is illustrated in FIG. 2.

As shown, a receiver 2 and transmitter 4 are connected to a common antenna 6. A package measurement-reporter 8 is connected to the receiver 2 and, when activated by a command from the network, supplies a package measurement report back to the network via the transmitter 4.

A packet cell changer 10 is connected to the receiver 2 and, in response to a received package cell change order, generates a command signal. The command signal is fed via a first AND gate 12 to a switching unit 14, which causes the transmitter 4 and receiver 2 to switch or retune to a new cell. An activity monitor 16 is connected to the output of the receiver 2 and the input of the transmitter 4 to provide an output signal when activity is detected. This output signal is fed via an inverter 18 to the other input of the AND gate 12 so as to close the gate 12 when activity is detected. The output of the activity monitor 16 is also fed to a gate 20. The gate 20 is connected to the output of the changer 10 and feeds a timer 22. The period of the timer is set by a mean talk spurt detector 24 connected to the output of the receiver 2 and the input of the transmitter 4 and which provides a measure of the mean talk spurt period. The output of the timer 22 is connected to the switching unit 14. The switching unit 14 thus effects a change-over or retuning to a new cell as described hereinbefore.

It will be appreciated that the described system achieves handover for real time wireless packet switched services in GPRS/EGPRS by providing a mechanism for handover that does not require the complete abandonment and reestablishment of the packet flow as given in the current GPRS/EGPRS standards. The mechanism allows for the continuation of the packet flow during handover thus improving on the Quality of Service provided by existing methods for real time wireless packet switched systems such as GPRS/EGPRS.

RT handover wireless packet switched services is provided by the incorporation of the statistical nature of the RT traffic to assist in the handover. This is done through the implementation of the timer $T_{HO}$ in the mobile and through the implementation of new signalling or message elements.

In order to support RT GPRS/EGPRS handovers, a number of additions and alterations to the current GPRS/EGPRS Radio Resource (RR) messages are required. The principle change occurs in the way the mobile reports and responds to reception measurements taken by the mobile and the Network. Redefining the NETWORK_CONTROL_ORDER field to be three bits in length to enable the incorporation of a new NC field dedicated to RT GPRS handover behaviour facilitates this change. The redefinition of the NETWORK_CONTROL_ORDER field is shown in Table 1.

| NETWORK_CONTROL_ORDER: bit(3) | | | | |
|---|---|---|---|---|
| $b_3$ | $b_2$ | $b_1$ | Field | Description |
| 0 | 0 | 0 | $NC_0$ | MS controlled autonomous cell reselection - no measurement report to N/W |
| 0 | 0 | 1 | $NC_1$ | MS controlled autonomous cell reselection - measurement reported to N/W |
| 0 | 1 | 0 | $NC_2$ | N/W controlled cell reselection - measurement reported to N/W |
| 1 | 0 | 0 | $NC_3$ | N/W controlled RT cell reselection - measurement reported to N/W |
| 1 | 1 | 1 | RESET | |

When the mobile station is operating in mode $NC_3$, the mobile station is given the capability of requesting a handover by sending a Packet Cell Change Request message to the network. The handover is affected in $NC_3$ and $NC_2$ modes by forcing the mobile to cell reselect on receipt of a Packet Cell Change Order. We also note that the mobile performs autonomous cell reselection when in its Standby and Ready States.

Sending either a Packet System Information Type 13, Packet Measurement Order or Packet Cell Change Order message sets the NC mode. These messages need restructuring in order to accommodate RT handovers. The principle modification to the Packet Measurement Order is in the NC Measurement Parameters field. The changes in this field reflect the type of measurements carried out by GSM mobiles in order to carry out handovers. This new structure is defined below.

<Packet Measurement Order content>::=
  <MESSAGE_TYPE: bit(6)>
  <PMO_INDEX: bit(3)>
  <PMO_COUNT: bit(3)>
  {0<Global TFI: Global TFI IE>
  |1<TLLI: bit(32)>}
  {0|1<NC Measurement Parameters: NC Measurement Parameters struct>}
  {0|1<EXT Measurement Parameters: EXT Measurement Parameters struct>}<spare padding>;

This change also effects the Packet Systems Information Type 5 message in the same manner described above.

The Packet Cell Change Order requires many more changes. The main incorporations into this message are so that a handover reference number, timing advance, new time slot and frequency for a specific base station given by the BSIC field can be passed to the mobile. Other additions and changes to this message occur in the Referenced Address field to reflect changes in TFI for the uplink and downlink and possible changes in the mobile IP address. Changes to the Packet Cell Change Order and the Reference Address structure are defined below.

<Packet Cell Change Order message content>::=
  <MESSAGE_TYPE: bit(6)>
  <PAGE_MODE: bit(2)>
  <Referenced Address: Referenced Address struct>
  <ARFCN: bit(10)>
  <BSIC: bit(6)>
  <HO_REFERENCE_N: bit(8)>
  {0|1<TIMING_ADVANCE: bit(16)>}
  <CHANNEL_TS_N: bit(3)>
  <CHANEL_FN: bit(10)>
  <NETWORK_CONTROL_ORDER: bit(3)>
  {0|1<NC Measurement Parameters: NC Measurement Parameters struct>
    <NC Frequency List: NC Frequency List struct>}
  }
  <spare padding>;
<Referenced Address struct>::=
  {0|1<NEW_IP_ADDRESS: bit(32)>
    {0<Global TFI: Global TFI IE>
    |1<TLLI: bit(32)>};
<Global TFI IE>::=
  {00 <UPLINK_TFI: bit(5)>
  |01 <DOWNLINK_TFI: bit(5)>
  |10 <UL_AND_DL_TFI: bit(10)>};

A new message, Packet Cell Change Request, is required in order that the mobile can request a cell reselection to a given base station that it has taken measurements on (BSIC NEW). This message is permitted in the NC₃ mode of operation. This message is included for two reason; firstly to comply with the original autonomous cell reselection philosophy of GPRS and in order to provide an additional element of flexibility to the system. This definition of the new message is set out below.

<Packet Cell Change Request message content>::=
   <MESSAGE_TYPE: bit(6)>
   <PAGE_MODE: bit(2)>
   {0<Global TFI: Global TFI IE>
   |1<TLLI: bit(32)>}
   <BSIC_NEW: bit(6)>
   <spare padding>;

The final changes required in the RR messages are to the Packet Measurement Report message. The principal change here lies in the definition of a new packet measurement reporting structure: NC Handover Measurement Report struct. This structure contains the same measurement report elements used by GSM mobiles in their handover reports. The changes to the Packet Measurement Report message and the definition of the report structure are given below.

<Packet Measurement Report message content>: :=
   <MESSAGE_TYPE: bit(6)>
   <TLLI: bit(32)>
   {0|1<PS15_CHANGE_MARK: bit(2)>}
   {00 <NC Measurement Report: NC Measurement Report struct>
   |01 <NC Handover Measurement Report: NC Handover Measurement Report struct>
   |10 <EXT Measurement Report: EXT Measurement Report struct>};

<NC Handover Measurement Report struct>::=
   {0|1{<MEASUREMENT_VALID: bit(1)>
     <RXLEV_FULL_SERVING_CELL: bit(6)>
     <RXLEV_SUB_SERVING_CELL: bit(6)>
     <RXQUAL_FULL_SERVING_CELL: bit(3)>
     <RXQUAL_SUB_SERVING_CELL: bit(3)>
     <NUMBER_OF_NC_MEASUREMENTS: bit(3)>
     {<BCH_FREQ_N: bit(5)>
     <RXLEV_N: bit(6)>
     <BSIC_N: bit(6)>}*(val(No of NC measurements))
      *6}
   }
   };

What is claimed is:

1. A cellular radio communication system for effecting handover of radio transmissions between a mobile station and one cell of a multicell network from said one cell to another cell of the network, the mobile station having a plurality of modes of operation in conjunction with the network, said plurality of modes including a) a mobile station controlled autonomous cell reselection mode with no measurements being reported to the network, b) a mobile station controlled autonomous cell reselection mode with a measurement report being transmitted to the network, c) a network controlled cell reselection mode with a measurement report from the mobile station to the network, and d) a network controlled real time cell selection mode with a measurement report from the mobile station to the network.

2. A system according to claim 1, wherein when in mode c), the mobile system acts in response to local criteria indicating the necessity of a cell change to transmit a Packet Cell Change Request message to the network.

3. A system according to claim 1, wherein the mobile station is forced to adopt modes c) or d) to reselect a predetermined cell upon receipt of a Packet Cell Change Order transmitted from the network.

4. A cellular communication handover system for effecting handover of radio transmission between a mobile station and one cell of a multicell network to radio transmission between said mobile station and another cell of the network, the network having handover means for forcing the mobile station to handover to a selected cell, the mobile station including mean talk spurt means for establishing the mean talk spurt in the transmissions to and from the mobile station, activity monitoring means for monitoring a predetermined type of activity of the transmitter and receiver of the mobile station, and delay means operable to delay any handover operation while said activity monitoring means senses activity for a period corresponding to the period of the mean talk spurt.

5. A system according to claim 4, wherein the delay means comprises a timer having a period set by the mean talk spurt means.

6. A system according to claim 4, wherein the network has reporting means for causing the mobile station to take and report back measurements of a given list of cells.

7. A system according to claim 6, wherein the network has selection means for selecting a said cell by comparing the measurements with reference values provided by a reference unit.

8. A system according to claim 7, wherein the mobile station includes means for determining from local criteria that a handover is required and prompting the network to effect handover using the reporting selection and handover means.

* * * * *